United States Patent [19]

Burson

[11] 3,842,961

[45] Oct. 22, 1974

[54] VARIABLE SPEED HANDRAIL

[75] Inventor: Richard D. Burson, Highland, Md.

[73] Assignee: The Johns Hopkins University, Baltimore, Md.

[22] Filed: May 31, 1973

[21] Appl. No.: 365,708

[52] U.S. Cl................ 198/16 R, 198/110, 104/25, 104/167, 104/172 R
[51] Int. Cl............................................ B66b 9/12
[58] Field of Search .............................. 198/16–18, 198/76, 110; 104/25, 166, 167, 172 R, 172 B, 172 C

[56] References Cited
UNITED STATES PATENTS

| | | | |
|---|---|---|---|
| 1,671,207 | 5/1928 | Parlongue............................ | 198/76 |
| 3,601,246 | 8/1971 | Dubois................................ | 198/16 R |
| 3,712,448 | 1/1973 | Burson et al...................... | 198/16 MS |
| 3,743,077 | 7/1973 | Hammitt............................. | 198/110 |

Primary Examiner—Richard A. Schacher
Assistant Examiner—Joseph E. Valenza
Attorney, Agent, or Firm—Robert E. Archibald; Kenneth E. Darnell

[57] ABSTRACT

A variable speed handrail comprising a continuous sleeve formed of a resilient material capable of bellows-like longitudinal expansion and contraction and being further resistant to buckling or compression due to radially-directed pressures. A variable pitch screw drive mechanism is utilized to impart differential velocities to the sleeve at points along the sleeve, the sleeve serving normally as a hand-grip for passengers being moved along a variable speed walkway to assure passenger stability during acceleration of the walkway from boarding to traveling velocity. The sleeve is fitted with spaced rib-like members which serve to expand and contract the sleeve at selected locations along the handrail in response to the pitch of the screw drive mechanism and synchronously with the variable speed motion of the associated walkway.

11 Claims, 7 Drawing Figures

VARIABLE SPEED HANDRAIL

STATEMENT OF GOVERNMENT INTEREST

The invention herein described was made in the course of or under a contract or subcontract thereunder, with the Department of the Navy.

BACKGROUND OF THE INVENTION

1. Field of the Invention

The invention generally relates to the art of moving conveyors, particularly passenger conveyors, having the capability of providing a variable speed surface for receiving a passenger at a safe relatively low boarding speed and accelerating said passenger to a relatively high traveling speed and subsequently decelerating the passenger to a relatively low, safe discharge speed, the invention particularly relating to a variable speed handgrip or handrail structure for use with such passenger conveyors.

2. Description of the Prior Art

The invention is primarily directed to use with variable speed conveyors or walkways and particularly to such walkways which are employed for dynamic boarding of and disembarkation from urban mass transportation systems. In present day urban areas, the status of pedestrian has virtually regained its former rank as the most efficacious manner of intra-urban movement. A variable speed walkway, operated either as an integral part of an urban transportation system or utilized independently over relatively short distances, offers potential for reversing this discouraging trend.

Practical variable speed walkways have recently been proposed, including the device disclosed by Burson et al. in U.S. Pat. No. 3,712,448. However, a workable handrail or hand-grip capable of variable speed movement synchronously with a variable speed walkway has not been previously proposed. Prior art constant speed handrails, such as the one disclosed by Takenoga et al. in U.S. Pat. No. 3,170,557, superficially resemble the structure of the present invention but are incapable of functioning in a variable speed mode due in part to the non-expandable nature of the sleeve-like member forming the handrail surface and to the constant speed drive mechanisms employed to drive said member in a continuous loop.

SUMMARY OF THE INVENTION

Moving belt passenger conveyors usually take the form of moving stairways or walkways having a continuous handrail disposed on each side of the conveyor, the handrail taking the form of an elongated loop having an upper run to be grasped by conveyor passengers. The present handrail is similarly utilized but in concert with a moving belt traveling at varying speeds along its exposed surface. The movements of the present handrail are synchronized with the movements of the passenger conveyor with which it is used. Thus, a passenger boarding a variable speed walkway at a constant, relatively slow rate of travel may grasp the exposed surface of the present handrail at a locus that is moving at the same velocity as the locus on the walkway at which the passenger stepped onto said walkway. As the passenger is accelerated on the walkway to a relatively high rate of travel, the locus at which the passenger is grasping the handrail is also synchronously accelerated so that the passenger can maintain stabilizing contact with the handrail. Similarly, the present handrail may be employed to maintain the comfort and safety of a passenger during deceleration of the variable speed walkway prior to exit of the passenger from the walkway.

Generally, the variable speed handrail of the invention is comprised of a continuous, expandable sleeve capable of movement at differing speeds along a portion thereof which is exposed to manual contact by a user. The expandable sleeve is fitted with spaced rib-like members which are driven by a variable pitch screw mechanism at speeds dependent on the instantaneous pitch of said screw mechanism to cause the sleeve to expand and contract along its longitudinal axis. The rib-like members may also assist in maintaining the physical conformation of the sleeve. The present handrail further comprises at least two closed loop track supports on which rollers attached to the rib-like members move in response to the pitch of the screw mechanism during variable speed motion of the sleeve. The rib-like members, and thus the sleeve, are moved at constant speed around the return portion of the handrail by a link chain moving at constant speed. The rib-like members are each fitted with a screw follower which engages the threads of the variable pitch screw mechanism. The screw mechanism is longitudinally disposed along the length of the exposed portion and is synchronously driven at a constant rotational speed by a suitable motor and gearing arrangement.

In light of the structure briefly described above, the operation of the present handrail may be understood. The screw mechanism drives each individual rib-like member at a constant relatively slow speed (corresponding to the boarding speed of an associated variable speed walkway), accelerates the member to a constant higher rate of speed (corresponding to the high speed travel portion of said walkway), and then decelerates each member to a constant, relatively slow speed (corresponding to the exit speed of the walkway). During these sequential velocity changes, the movement of the rib-like members causes the expandable sleeve first to expand (during acceleration) and then to contract (during deceleration), thereby causing a point at which a user would grasp the handrail surface (i.e., on the surface of the sleeve) to accelerate, travel at a constant relatively high speed, and then to decelerate synchronously with the variable speed movement of the associated walkway.

Thus, a principal object of the present invention is to provide a moving handrail having variable speed capability over the length of a portion thereof which is exposed to be grasped by a user.

A further object of the invention is to provide a variable speed handrail which may be grasped by a user for comfort and support during concurrent use of a variable speed walkway, the variable speed motion of the handrail corresponding to and being synchronized with the motions of said walkway.

Further objects and attendant advantages of the invention will become apparent in light of the following detailed description thereof.

DESCRIPTION OF THE PREFERRED EMBODIMENTS

Figure 1:
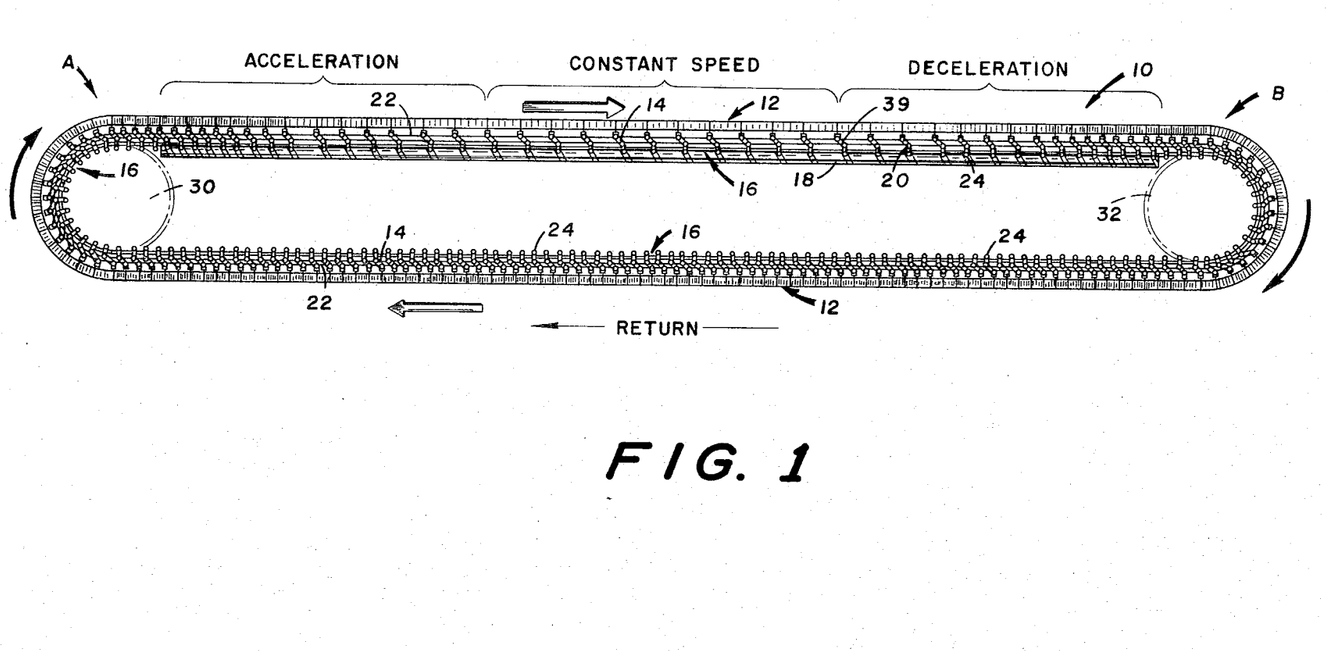
FIG. 1 is a diagram illustrating the basic principles of operation of the handrail and particularly the relationship between the expandable sleeve, the rib-like carriage members, and the variable pitch screw drive mechanism as they would appear at the several stages of acceleration, travel, and deceleration.
Figure 2:
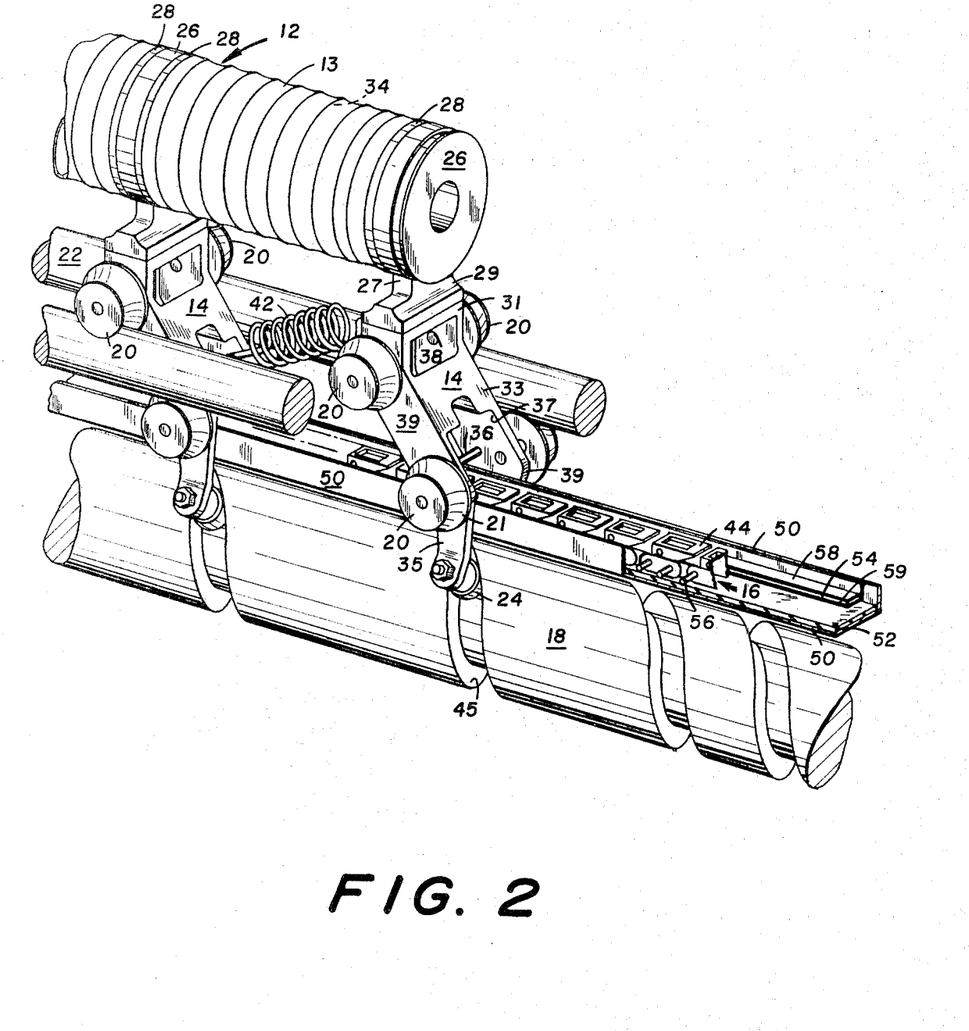
FIG. 2 is a perspective in partial section of a portion of the handrail along the exposed portion thereof which is available for manual contact by a user.

The invention may be best understood by referring first to FIG. 1. In FIG. 1, the systematic operation of the invention is seen to encompass four distinct functional movements of a longitudinally expandable handrail sleeve member 12 and interconnected carriage members 14 which comprise the present handrail 10, the functional movements being acceleration, constant speed travel, deceleration, and return. Use of the handrail 10 in concert with a variable speed sidewalk may be understood by taking the area about point A to be the location at which a user boards a variable speed sidewalk (not shown) which runs parallel to the length of the handrail. The user boards such a sidewalk at a constant low speed and grasps the handrail 10 at A, said point A lying on the exposed surface of the sleeve member 12 and moving at the same constant low speed at which the user boarded the sidewalk. As the user is accelerated to a constant high speed by the sidewalk, the sleeve member 12 which is being grasped by said user is synchronously accelerated to the same constant high speed in order that the user may comfortably and safely maintain his balance during this acceleratory movement. After travel at the constant high speed for a predetermined distance both the sidewalk and the handrail 10 are simultaneously decelerated to allow the user to disembark at point B at a safe speed. The sleeve member 12 and interconnected carriage members 14 comprising the handrail 10 are then returned about a continuous loop to point A where that portion of the sleeve member 12 previously grasped by the user is again presented for use. Since the sleeve member 12 is formed into a continuous loop, a surface is continuously being made available for use.

The carriage members 14 attach to the continuous sleeve member 12 in a manner to be described hereinafter and, by their movements, cause the sleeve member to expand or contract to produce acceleration or deceleration of the handrail surface. Movement of the carriage members 14 is accomplished during the constant low speed and return functions by means of a constant speed chain 16. Essentially, the chain 16 is driven by a motorized sprocket 30 (shown in phantom) in a continuous loop conforming to the loop formed by the sleeve member 12, the carriage members 14 being releasably connected to the chain 16 and being thereby carried around a continuous loop immediately surmounted by the sleeve member 12. The carriage members 14 disengage from the chain 16 during the acceleration, constant speed travel, and deceleration functions, the members 14 then being driven by a variable pitch screw mechanism 18 which is rotating at a constant speed in a manner to be described hereinafter. The carriage members 14 engage the screw mechanism 18, while being moved by the chain 16, and are then accelerated by the mechanism 18 to a constant high speed according to the pitch of the screw mechanism 18, the pitch of the mechanism 18 being chosen to conform to the requirements of a particular handrail installation. Since the sleeve member 12 is attached to the carriage members 14, portions of said sleeve member 12 are continuously accelerated to the constant high speed by the screw mechanism 18. In like manner, the carriage members 14, and thus the sleeve member 12, are decelerated to a constant low speed and are again picked up by the chain 16 to be returned around a passive sprocket 32 (also shown in phantom) and around a lower return loop of the handrail 10 to again engage the screw mechanism 18. The carriage members 14 are fitted with two pairs of track followers 20 which rollingly engage track elements 22, shown in FIGS. 2–6. Each carriage 14 is also fitted with a cam follower 24 which engages the pitched groove 45 in the screw mechanism 18 such that the constant speed rotary motion of the mechanism 18 is transmitted into a linear variable speed movement of the carriage members 14.

As seen in FIG. 1, the carriage members 14 are more closely spaced during the constant low speed return function, the members 14 assuming a greater spatial separation on acceleration thereof by the screw mechanism 18. This separation of the carriage members 14 causes the sleeve member 12 to expand longitudinally, thereby causing acceleration of the surface presented to the grasp of a user. In the constant high speed phase of handrail operation, the carriage members 14 move at a constant, relatively wider spacing, the sleeve member 12 likewise moving at a relatively fast rate of travel during the constant high speed phase of handrail operation. In a similar fashion, the sleeve member 12 longitudinally contracts according to the deceleratory movement of the carriage members 14 produced by the change in pitch of the screw mechanism 18 along its right end portion as viewed in FIG. 1. Thus, the handrail 10 provides a continuous surface to be grasped by a user, which surface is accelerated to a constant high rate of speed and then decelerated to a desired lower rate of speed.

Figure 4:
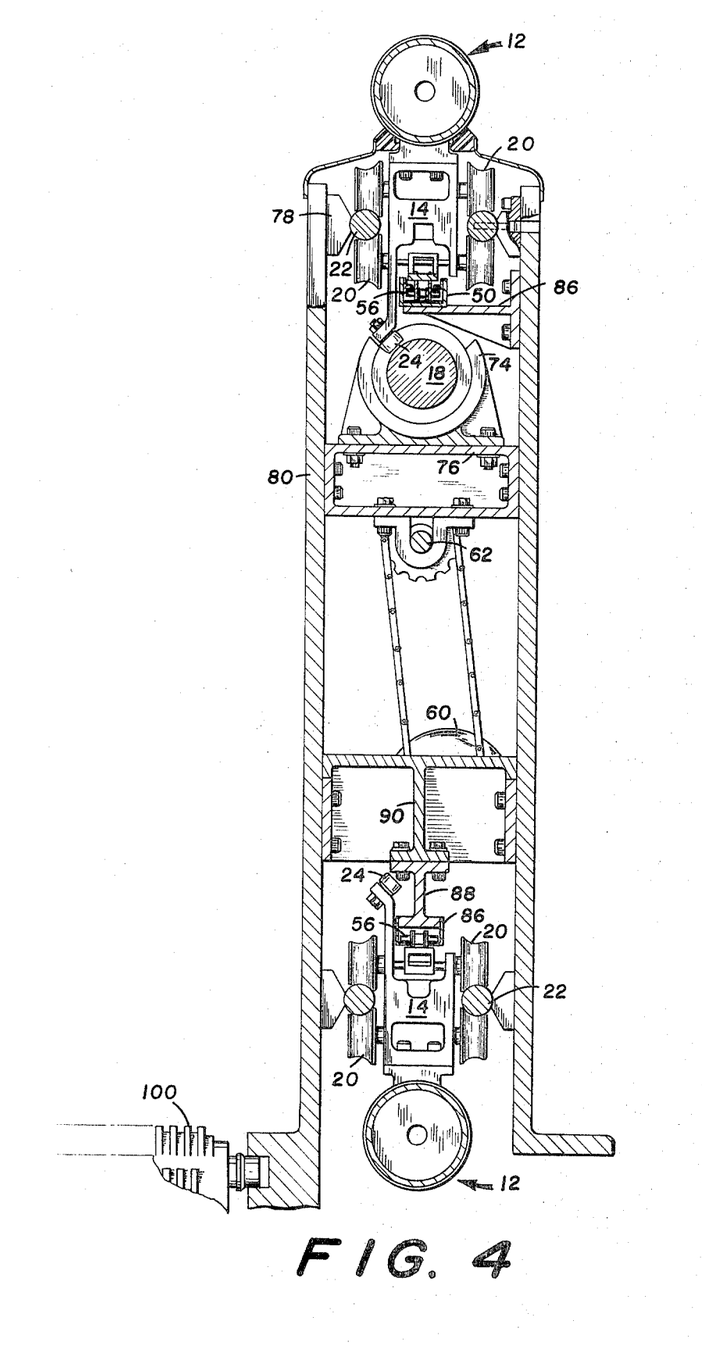
FIG. 4 is a section of the handrail on the line 4—4 of FIG. 3.
Figure 5:
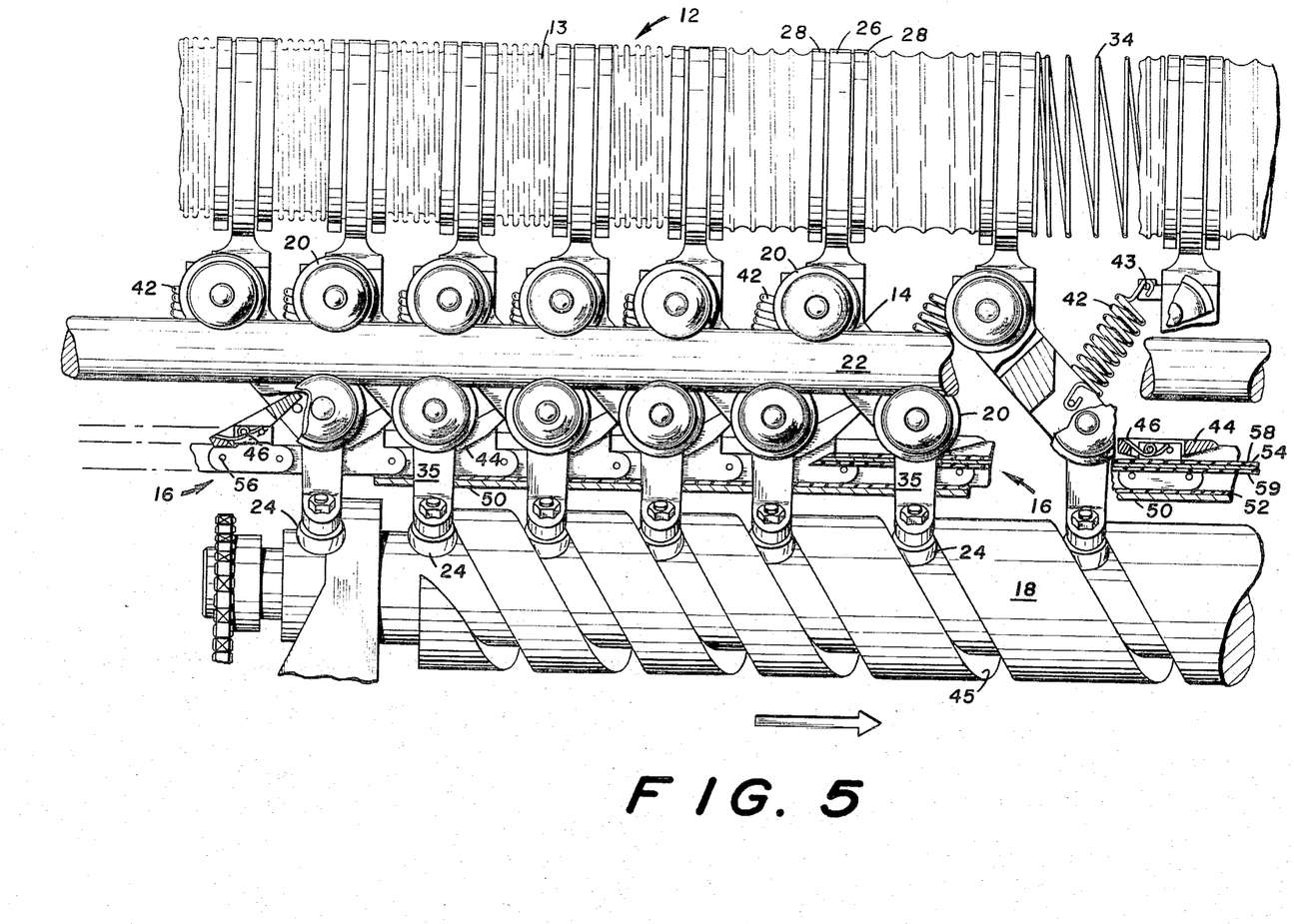
FIG. 5 is a detail section illustrating the rib-like carriages and the expandable sleeve in the low-speed mode as said carriages engage the variable pitch screw drive mechanism.
Figure 6:
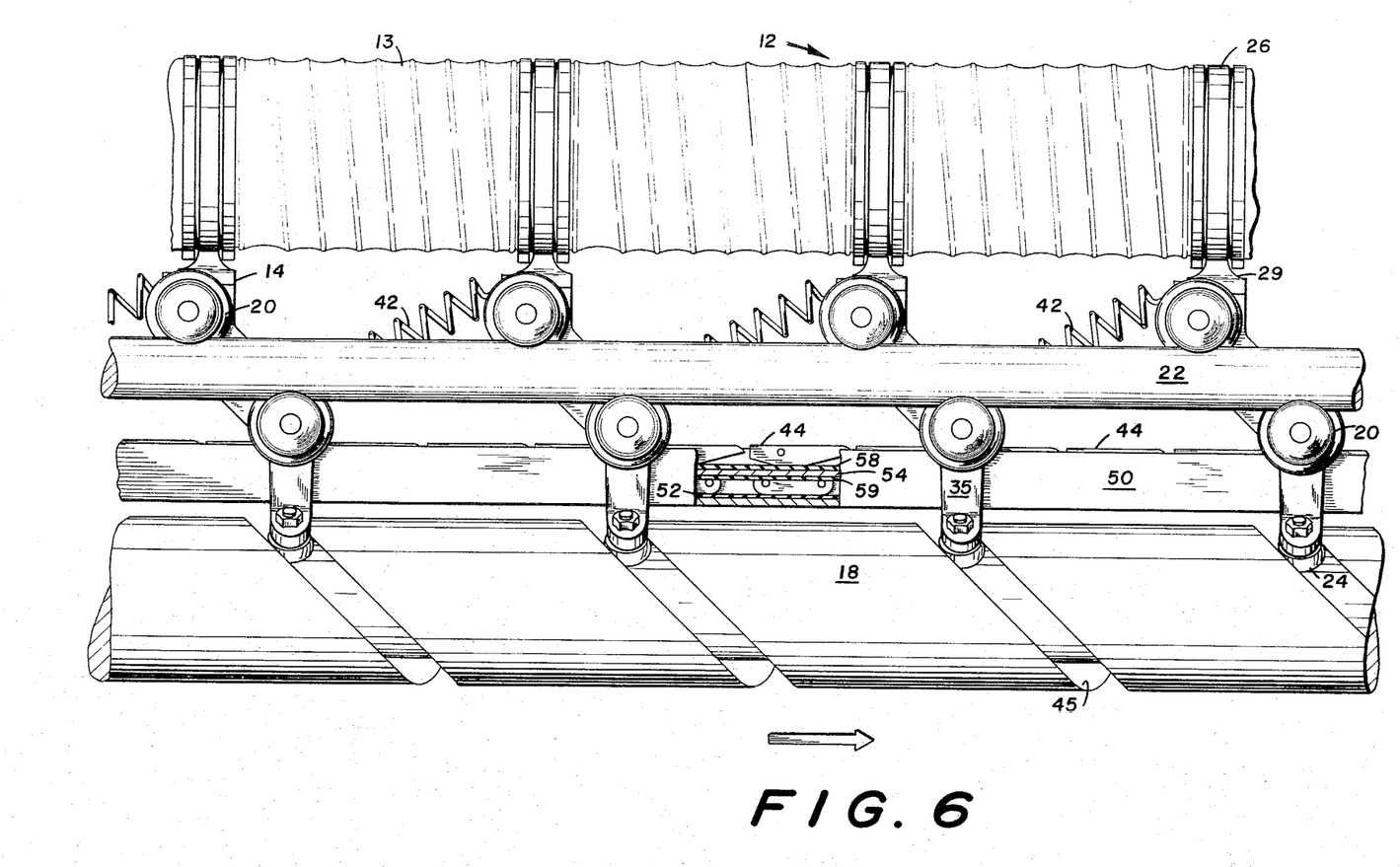
FIG. 6 is a detail section illustrating the rib-like carriages and the expandable sleeve in the high-speed mode; and, FIG. 7 is an idealized perspective showing the drive mechanism used to operate the handrail.

FIGS. 2 through 6 illustrate more clearly the mechanical operation of the major structural elements comprising the invention. The sleeve member 12 is seen to comprise longitudinally expandable bellows-like sections 13 held onto disclike sleeve partitions 26 by band clamps 28 disposed on either side thereof. Each expandable section 13 is reinforced with a longitudinally-disposed spiral wire coil 34, the coil lending axial stability to the section 13 in order to prevent distortion on grasping of the section by a user. The coil 34 is covered wtih a well-known wear-resistant fabric-like material capable of undergoing repeated mechanical oscillation due to the continuous expansion and contraction of the sleeve member 12. Each wire coil 34 is spaced within the corresponding section 13 such that the spaces between adjacent circular portions of the coil 34 remain sufficiently wide to prevent pinching of a user's fingers, etc., while the sections are contracting in bellows-like fashion during the deceleration function. On full extension of the section 13, i.e., during the constant high speed operation of the handrail 10, the exterior surfaces of the sections 13 are essentially smooth and cylindrical as shown in FIG. 6.

Each sleeve partition 26 is integrally formed with a neck 27 which enlarges to a generally rectangular base 29. The base 29 is permanently attached to the uppermost portion of a carriage member 14, thereby providing connection between the sleeve member 12 and each individual carriage member 14. Each carriage member 14 is essentially comprised of a body member which is substantially rectangular when viewed frontally as in FIG. 4. When viewed in elevation as in FIGS. 2, 3, 5, and 6, the body member of carriage member 14 is seen to be comprised of two upper and lower body portions 31 and 33 which substantially meet at a 45° angle. An essentially Y-shaped frontal recess 37 is formed in the lower body portion 33, the recess 37 extending from the front to the rear of the carriage member 14 and thereby providing clearance for structure to be described hereinafter. The recess 37 is defined in part by side body portions 39, a carriage pickup rod 36 extending between the portions 39. One each of the track followers 20 is rotatably secured to the exterior of each of the side body portions 39 by means of threaded axles 38. The other pair of track followers 20 are similarly disposed on the exterior side surfaces of the upper body portion 31, the axes of the respective pairs of axles 38 being mutually parallel to each other and perpendicular to the direction of travel of the handrail 10. An aperture 40 may be formed in the upper body portion 31 to reduce carriage weight and to simplify installation of the axles 38 and the base 29 thereon. The lower body portion 33 further has an integral spur 35 extending from one of the side body portions 39 toward the variable pitch screw mechanism 18.

Each pair of track followers 20 located on opposite sides of the carriage members 14 engage the track elements 22, one each of which elements lie on either side of the carriage member 14. The track elements 22 each comprise a cylindrical member formed into a continuous loop having essentially parallel upper and lower longitudinal portions and semi-circular end portions. The track followers 20 have sloping exterior surfaces 21 which are formed into circular arcs conforming to the cylindrical surfaces of the track elements 22. Alternatively, it can be seen that the track followers 20 may comprise standard wheels which would run in grooved, straight-wall tracks formed in the sides of supporting members such as is described in the prior art. The present arrangement tends to eliminate "cocking" problems associated with these prior art structures and is additionally more easily constructed. In order to maintain the track follower pairs of adjacent carriage members 14 in positive contact with the track elements 22, coil springs 42, shown in FIG. 5, are affixed at one end to a centrally located collar 43 on the rear of the upper body portion 31 of a forward carriage member 14 and at the other end to an oppositely disposed point on the front surface of the lower body portion 33 of the carriage member 14 immediately to the rear of the first-mentioned carriage member.

As previously mentioned relative to FIG. 1, the carriage members 14 and the sleeve member 12 are moved around the loop of the handrail by means of a chain 16 when the carraige members 14 are not engaged by the variable pitch screw mechanism 18. As clearly shown in FIGS. 3 and 5, the chain 16 releasably connects to the carriage members 14 by means of tooth-like ratchets 44 attached to alternate links of the chain, which ratchets engage the pickup rods 36 on the members 14 as said members 14 move away from the deceleration end of the screw mechanism 18. The chain 16, thereby coupled to the carriage members 14 by means of the biasing action of the ratchets 44 on the rods 36, pulls the carriage members 14 around both the passive sprocket 32, along the bottom portion of the continuous loop of the handrail 10, and around the motorized sprocket 30, said sprocket 30 providing the motive force to move the chain 16. As particularly seen in FIG. 3, the carriage members 14 follow the track elements 22 durin this return function and are thereby delivered to the variable speed screw mechanism 18.

FIG. 5 more clearly illustrates the operation of the present structure at the point where the cam followers 24 on each carriage member 14 are accepted onto the screw mechanism 18. The carriage members 14 are pulled along the track elements 22 by the chain 16, the ratchets 44 providing releasable connection between the chain 16 and the members 14. The cam follower 24 of each carriage member 14 mates with the pitched groove 45 of the screw mechanism 18 at the same speed at which the chain 16 is moving the members 14 around the handrail loop. After engagement with the screw mechanism 18, the carriage members 14 are moved for a short distance at the same speed at which they engaged the mechanism 18 and are then accelerated by a change in pitch of the pitched groove 45 cut into the screw mechanism 18. Acceleration of the carriage members 14 causes the constant speed chain 16 and the members 14 to disconnect, the ratchets 44 becoming disengaged from the pickup rods 36 as the speed of the carriage members 14 increase. Each ratchet 44 thus disconnected from a carriage member 14 is subsequently biased downwardly against the action of ratchet spring 46 by camming ledges 54 extending from the opposite interior side walls of chain guideway 50. The ledges 54 cause the ratchets to assume a substantially horizontal position so that the ratchets 44 do not interfere with oncoming carriage members 14 being accelerated along the mechanism 18. The ratchets 44 are thus moved out of the way of succeeding carriage members 14 which are accelerated over the positions occupied by ratchets 44. This removal of the ratchets 44 from contact with the carriage members 14 reduces mechanical noise and prevents wear.

The chain guideway 50 is an essentially rectangular U-shaped trough which extends the full length of the upper horizontal portion of the handrail loop. The guideway 50 is so located that the chain 16 is received into said guideway when said chain moves from the motorized sprocket 30. The guideway 50 essentially supports the chain 16 over the upper portion of the handrail loop so that the chain 16 is not gravitationally deformed. A relatively friction-free surface layer 52, which could be formed of "Teflon" or some similar material, is disposed over the interior floor-like portion of the guideway 50, the surface layer 52 acting to reduce noise and wear between the moving chain 16 and the guideway 50. The guideway 50 is further formed with the aforementioned camming ledges 54 which also act to maintain the chain 16 within the lower portion of the guideway 50. The ledges 54, disposed on either side of the guideway 50, act to retain chain pins 56, which project from either side of each link of the chain 16, within the channel defined in the lower portion of the guideway 50 by the surface layer 52, the lower portion of the side walls of the guideway, and the ledges 54. The camming ledges 54 do not extend completely across the guideway 50. Both the upper and the lower surfaces of the camming ledges 54 are covered with layers 58 and 59 of relatively friction-free material in order to reduce noise and wear due to contact with the ratchets 44 and the pins 56 respectively.

When the links of the chain 16 approach the end of the upper horizontal portion of the handrail loop at the point where the ledges 54 are discontinued, the ratchets 44 immediately assume their extended position due to the biasing action of the springs 46. At this point of the handrail, the carriage members 14 have been decelerated by the pitched groove 45 of the screw mechanism 18 to the same speed at which the chain 16 is moving. As the carriage members 14 move from the screw mechanism 18, the now-deployed ratchets 44 engage the members 14 along the pick-up rods 36 and return said members 14 around the remaining portion of the handrail loop to once again engage the screw mechanism 18 at the acceleratory portion thereof.

Figure 3:
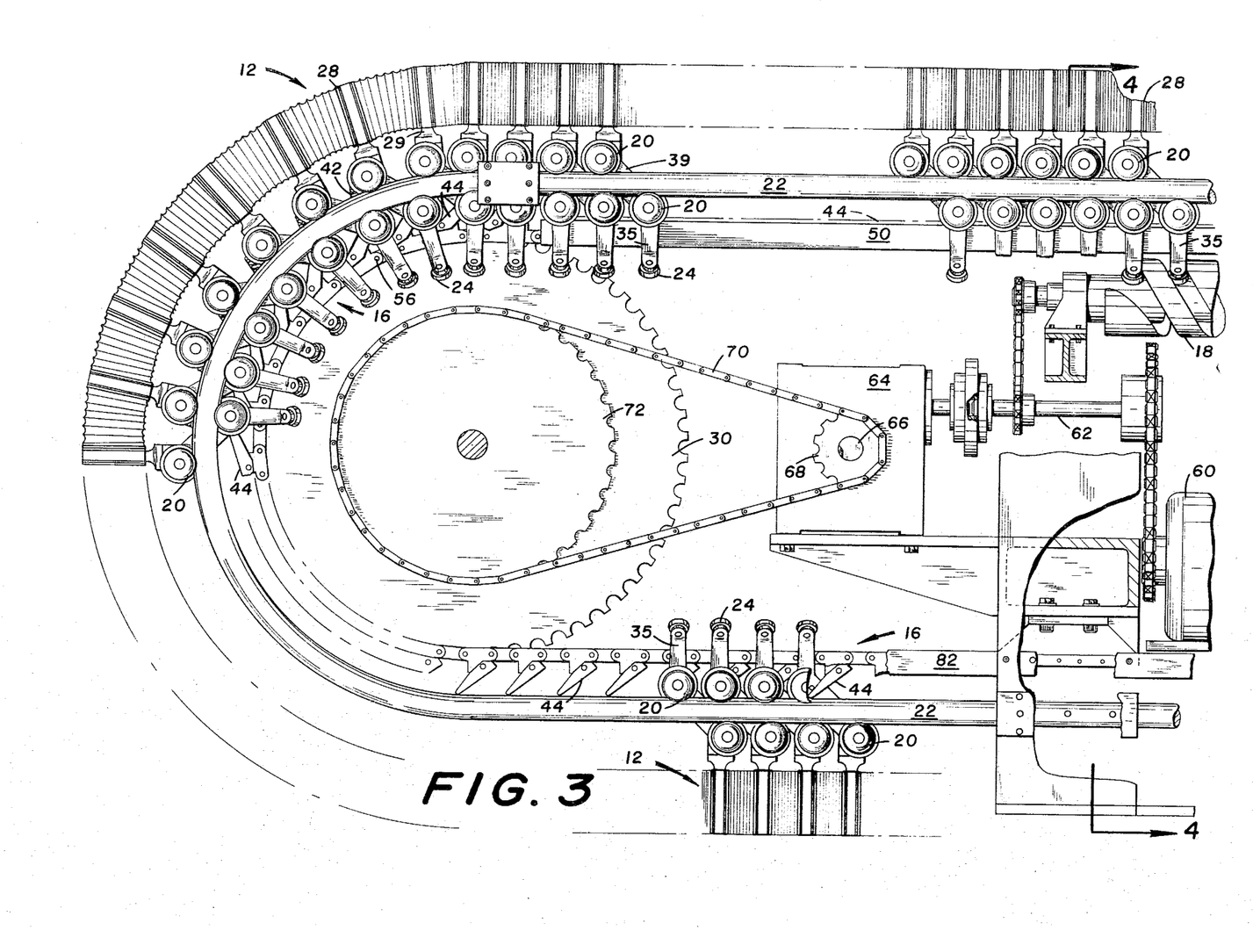
FIG. 3 is a longitudinal section of an end portion of the handrail.
Figure 7:
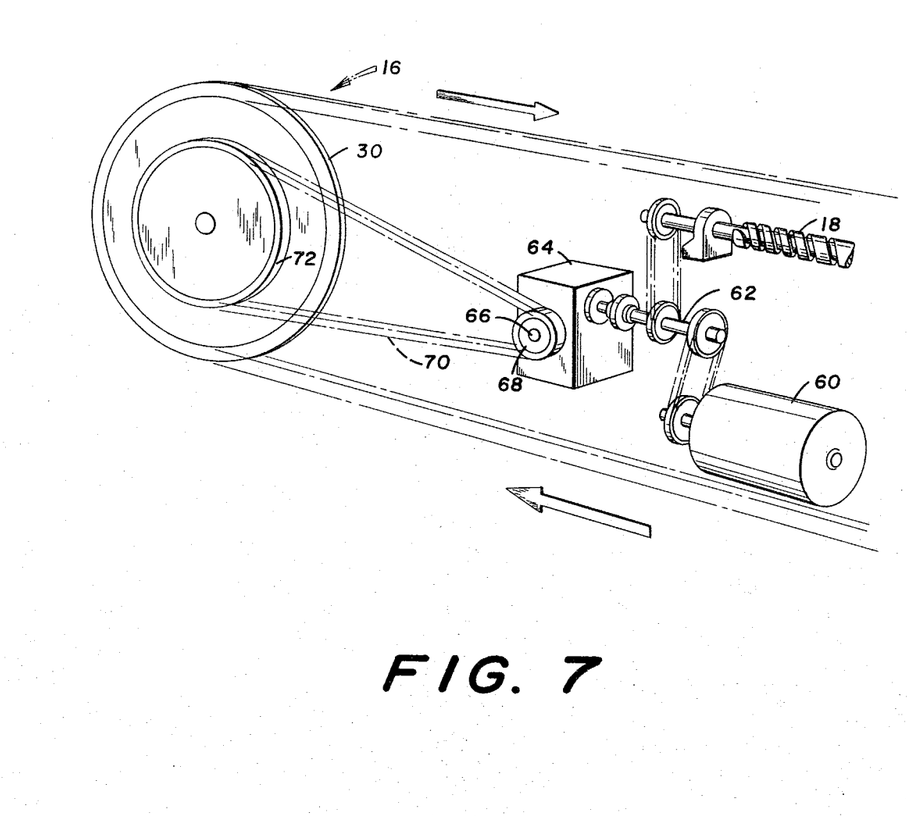

Referring particularly to FIGS. 3 and 7, the motive arrangement used to drive the handrail 10 is illustrated. Motive force is provided by a constant speed motor 60 which drives power take-off shaft 62, the shaft 62 being coupled directly to the screw mechanism 18 and also being coupled to a right angle worm gear box 64. The gear box 64 drives an output shaft 66 onto which is fitted a toothed gear 68. A chain 70 connects the gear 68 to a larger gear 72 fixedly joined to the side of the sprocket 30, power from the motor 60 being thus transmitted to the sprocket 30 so that the chain 16 is moved around the handrail loop at a constant speed. The screw mechanism 18 is also driven at a constant speed by the motor 60 through the direct power linkage from the shaft 62. The shaft 62 could alternatively be mechanically joined to the drive arrangement of a variable speed sidewalk in an obvious fashion, thereby eliminating the need for a separate motor to drive the handrail.

As can be seen in FIGS. 3 and 4, the screw mechanism 18 is supported at one end by bearing 74, which bearing 74 is held by support member 76. The screw mechanism 18 is similarly supported along its length by a plurality of similar bearings. The track elements 22 are held in position by supports 78 which are attached to the internal walls of a housing 80, the support member 76 and other support members not shown being similarly attached to the walls of the housing 80. The housing 80 would normally be positioned along a variable speed sidewalk 100 such that a user of the sidewalk 100 could grasp the exposed portion of the sleeve member 12 which is presented for use. As can also be seen in FIGS. 3 and 4, a return guideway 82 is disposed along the lower return portion of the handrail loop between the two sprockets 30 and 32. The chain 16 is received within an inverted U-shaped guideway 82 and held therein by guide ledges 84 which retain the chain pins 56 within the channel formed by the guideway 82 and the ledges 84. The guideway 82 must be open along its lower surface to allow the ratchets 44 to remain in their extended positions, thereby to maintain contact with the carriage members 14. The upper guideway 50 is held within the housing 80 by a right-angle support member 86, the lower guideway 82 being held by an I-beam support member 88 extending from a lower housing support 90.

FIG. 6 particularly illustrates the handrail 10 during the constant high speed travel phase of its operation. The handrail sections 13 are seen to be fully extended due to the maximum separation of the partitions 26. The springs 42, joining adjacent carriage members 14 are seen to be forced to the maximum extension, the springs 42 acting to maintain the track followers 20 in contact with the track elements 22. The disposition of the chain 16 within the guideway 50 during this high speed phase of handrail operation is clearly seen, the ratchets 44 being held in a substantially horizontal position by the camming action of the ledges 54.

The invention may be embodied in apparatus other than that specifically shown and described herein. In particular, the carriage members 14 may be driven by means other than the screw mechanism 18. Mechanical devices, such as expansion links, could be employed to provide the acceleration, deceleration, and constant speed travel functions. Of particular note is the use of the screw mechanism 18 or other variable speed drive means to move the carriage members 14 along only the acceleration and deceleration portions of the handrail 10. In such a system, an additional chain traveling at the predetermined constant high speed to which the members 14 are accelerated could be positioned to receive the members 14 from a shorter acceleration-only portion of a screw mechanism. Ratchets, such as the ratchets 44, on the high-speed chain would thereby engage the members 14 and pull said members, and thus the sleeve member 12, along at the predetermined constant high speed. The members 14 could then be decelerated as desired to match the movements of an associated variable speed sidewalk by moving the members 14 onto a deceleration-only screw mechanism whereupon the handrail 10 would be decelerated to again be picked up by the chain 16 or, alternatively, to be again accelerated either with or without disengagement from the screw mechanism according to the design of the particular handrail installation. In this fashion, a handrail of any desired length and having intermediate deceleration, acceleration, and constant high and/or low speed portions could be constructed. It is believed obvious that such modification of the concepts shown and described herein are within the scope of the invention as recited in the following claims.

I claim:
1. A variable speed handrail comprising:
 a longitudinally deformable sleeve member having a surface for reception of the hands of users of the handrail and which surface is movable at differing speeds at various points thereon;
 means for deforming the sleeve member longitudinally of its length so as to cause selected spaced points on the aforesaid surface of the sleeve member to move at differing speeds;
 carriage members joined to the sleeve member at spaced points along its length, said carriage members being driven by the aforesaid means at differing speeds at predetermined positions along the sleeve member so as to deform said sleeve member longitudinally of its length, thereby causing spaced points on the surface of the sleeve member to move at differing speeds; and, chain means releasably connected to the carriage members for moving said carriage members along portions of the handrail, the chain means comprising a link chain having pivotable ratchet-like members connected to selected links of said chain, one each of the ratchet-like members engaging one each of the carriage members to provide releasable connection between the chain and the carriage members.

2. The variable speed handrail of calim 1 and further comprising spring means disposed internally of the sleeve member for resisting axial deformation of the sleeve member.

3. The variable speed handrail of claim 1 wherein the sleeve member is comprised of a plurality of deformable sections which expand longitudinally to increase their proportional contributions to the total surface area of the sleeve member on acceleration of said sleeve member and contract longitudinally to decrease their proportional contributions to the total surface area of the sleeve member on deceleration of said sleeve member.

4. The variable speed handrail of claim 1 and further comprising:

spring means connecting adjacent carriage members.

5. The variable speed handrail of claim 1 wherein the means for deforming the sleeve member comprise at least one variable pitch screw mechanism, the screw having a groove so pitched that the carriage members are driven by said mechanism at differing speeds along the length of said mechanism.

6. The variable speed handrail of claim 1 and further comprising:

track means engageable with the carriage members and providing surfaces on which said carriage members are supported during movement thereof along the handrail.

7. The variable speed handrail of claim 6 wherein the track means and the sleeve member are formed in a continuous loop.

8. The variable speed handrail of claim 1 wherein successive carriage members are closely spaced when loci on the surface of the sleeve member are traveling at a constant relatively low speed and are progressively separated to relatively greater spacings during acceleration of the loci on the surface of the sleeve member.

9. The variable speed handrail of claim 1 and further comprising:

a guideway member in which the chain means are disposed along portions of the handrail.

10. The variable speed handrail of claim 9 and further comprising:

camming means on the guideway member for biasing the ratchet-like members to a horizontal position on disconnection of the ratchet-like members from the carriage members.

11. A variable speed handrail comprising:

a member having a surface for the reception of the hands of a user of the handrail;

carriage means joined to the member at spaced points along its length;

means for moving the carriage means and thus the member at differing speeds at various points of the handrail so as to cause spaced points on the surface of the member to move at differing speeds; and, chain means releasably connected to the carriage means for moving said carriage means along portions of the handrail, the chain means having pivotable ratchet-like members disposed at spaced points of the chain, the ratchet-like members engaging the carriage means to provide releasable connection between the chain means and the carriage means.

* * * * *